United States Patent
March et al.

(10) Patent No.: US 6,327,358 B1
(45) Date of Patent: Dec. 4, 2001

(54) SYSTEM AND METHOD FOR REROUTING DATA CALLS TO INTERNET SERVICE PROVIDER VIA LOWEST ACCESS POINT IN A TELEPHONE NETWORK

(75) Inventors: Sean March, Plano; Jeffrey Chen, Richardson, both of TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/300,131

(22) Filed: Apr. 27, 1999

(51) Int. Cl.$^7$ .................................................. H04M 7/00
(52) U.S. Cl. ............................ 379/221.01; 379/211.02; 379/219; 370/352; 370/401
(58) Field of Search .................... 379/211.01, 211.02, 379/210.01, 212.01, 214.01, 215.01, 207.01–207.16, 221.01, 221.02, 221.06, 221.07–221.15, 219, 220.01; 370/352, 400, 401

(56) References Cited

U.S. PATENT DOCUMENTS

| | | | |
|---|---|---|---|
| 5,799,072 | * 8/1998 | Vulcan et al. | 379/114.02 |
| 5,933,490 | * 8/1999 | White et al. | 379/221.01 |
| 6,078,652 | * 6/2000 | Barak | 379/114.02 |
| 6,084,892 | * 7/2000 | Benash et al. | 370/701 |
| 6,229,886 | * 5/2001 | Moody et al. | 379/219 |
| 6,243,760 | * 6/2001 | Armbruster et al. | 709/243 |

FOREIGN PATENT DOCUMENTS

| | | |
|---|---|---|
| 0 802 690 A1 | 4/1996 | (EP) . |
| WO 9738551 | 10/1997 | (WO) . |
| WO 9841925 | 9/1998 | (WO) . |

OTHER PUBLICATIONS

Blankers P: "Network Solution For Internet Access Services" Ericsson Review, SE, Ericsson. Stockholm, No. Spec. Int. ISS, 1998.

Tao J et al: Internet Access Via Baseband and Broadband ISDN Gateways: Proceedings of the Annual International Phoenix Conference on Computers and Communications, US New York, IEEE, vol. Conf. 13, Apr. 12, 1994.

Leconte A et al.: "Reshaping the IN for multimedia: is there a life after Internet?" International Conference On Intelligence In Networks, XX, XX, Nov. 1, 1996.

Arkko J et al: "Dial–up Service Via The Integrated Access System" Ericsson Review, SE Ericsson, Stockholm, No. SPEC. INT. ISS, 1998, pp. 14–19,J XP000751710.

* cited by examiner

*Primary Examiner*—Ahmad Matar
*Assistant Examiner*—Benny Q. Tieu
(74) *Attorney, Agent, or Firm*—Bruce Garlick; James Harrison

(57) ABSTRACT

A telephone network redirects calls intended for an Internet Service Provider (ISP) to one of a plurality of available Internet Protocol (IP) gateways operated by the ISP. A call is received by the telephone network at an originating switch from a subscriber's calling terminal, the call directed to a toll-free-number or a central number (TFN) for the subscriber's ISP. The originating switch interacts with the signaling network via a coupled service switching point (SSP) to request a Dialed Number (DN) corresponding to the TFN. A destination switch (or a Private Branch Exchange "PBX" coupled to the destination switch), instead of completing the call, redirects the call to a new IP gateway coupled to a new destination switch or coupled PBX. The call is then routed from the calling terminal to the new IP gateway via the originating switch and the new destination switch via a lowest point in the traffic network.

31 Claims, 9 Drawing Sheets

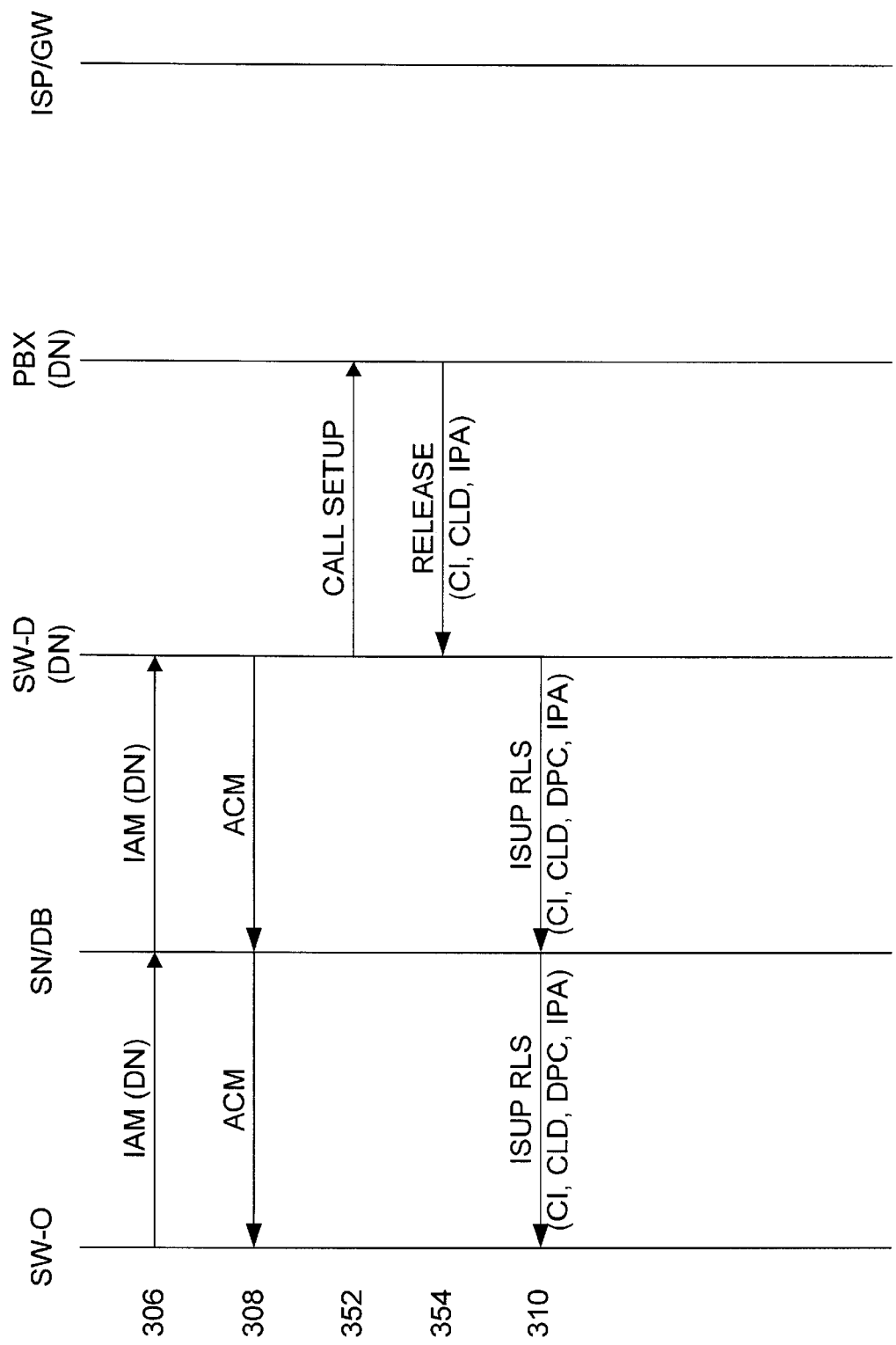

SYSTEM AND METHOD FOR REROUTING DATA CALLS TO INTERNET SERVICE PROVIDER VIA LOWEST ACCESS POINT IN A TELEPHONE NETWORK

RELATED APPLICATION

The present application is related to, and claims priority to co-pending application Ser. No. 09/300,130 filed on even date herewith which is incorporated by reference in its entirety.

BACKGROUND

1. Technical Field

The present invention relates generally to telephone networks and the Internet; and more particularly to the redirection of data calls within a telephone network.

2. Related Art

The structure of modern telephone networks often includes a traffic network and a coupled signaling network. The traffic network includes a plurality of switches interconnected by traffic handling trunks. Many of these switches serve as central office switches that couple to a plurality of terminals as well as to other of the plurality of switches. The signaling network interfaces with the traffic network to perform call routing and management functions among the plurality of switches and the plurality of traffic handling trunks.

In an example of the manner in which a telephone network services a call, a switch (originating switch) receives a request from a calling terminal that includes a Dialed Number, the calling terminal requesting that the call be completed to a called terminal associated with the Dialed Number. The Dialed number corresponds to a termination point coupled to another switch (destination switch). The originating switch initiates call set up by interacting with the signaling network and requesting that the call be set up and routed to the called terminal via the destination switch. During call set up, the originating switch forwards the Dialed Number in an access message.

The signaling network then routes the access message to the destination switch based upon the Dialed Number (or a Destination Point Code for the destination switch corresponding to the Dialed Number). The destination switch then attempts to allocate a traffic path (via one or more traffic trunk links) to the originating switch. If the allocation is successful, the destination switch attempts to connect to the destination terminal coupled thereto. During this coupling, the calling terminal is coupled to the destination switch so that it receives a facsimile of the alert signal sent to the called terminal. If the called terminal picks-up, the calling terminal is then coupled to the called terminal and the call is serviced.

Typical public Internet access currently includes linking a call from a subscriber to its Internet Service Provider (ISP) via the telephone network. In linking the call, the subscriber employs his or her modem (calling terminal) to dial the number of a modem bank (called terminal) of his or her service provider. The call is setup via the telephone network and terminated to the modem bank. An Internet Protocol gateway operated by the ISP coupled to the modem bank then sets up a data session with the subscriber's computer that is coupled to the subscriber's modem, such session setup is provided across the telephone network. With the session established, access to the Internet is then provided.

Many Internet service providers establish multiple modem banks, each of which couples to the telephone network at a corresponding location. For example, a large Internet service provider may include modem banks in the cities of Dallas, Richardson, Arlington, Fort Worth and other cities in the greater Dallas area. These modem banks allow most users to access the Internet service provider via a local phone call. However, most Internet service providers limit the access to each of these modem banks to locally registered subscribers. Thus, for example, a subscriber living in Richardson may only have access to the Richardson modem bank. If the subscriber is traveling away from Richardson and desires to access its Internet service provider, he or she may have to dial long distance into the Richardson modem bank.

Traveling subscribers may also be given access to his or her Internet service providers via a toll free number (e.g., 800, 888, etc.). However, while the subscriber does not pay telephone network toll charges for the call, he or she pays the Internet service provider based upon his or her usage. Thus, the Internet service provider is reimbursed for the telephone network toll charges it bears. However, this transaction provides little or no benefit to the Internet service provider since it must pay telephone network toll charges to the telephone company.

Calls made by subscribers to the toll free number are routed to a central modem bank that services the calls for the Internet session. For the duration of the call, therefore, the telephone network is required to provide access to the ISP. Such operations consume valuable resources of the telephone network. Further, because Internet sessions typically last longer then a typical voice call, the telephone network must service the calls for a longer period of time which places additional burden on the telephone network.

Thus, there exists a need in the art for a system and related operations in which data calls routed within a telephone network consume fewer resources of the telephone network and less adversely affect operation of the telephone network.

SUMMARY OF THE INVENTION

Thus, to overcome the shortcomings of the prior systems and their operations, a telephone network constructed according to the present invention includes call redirection functions that redirect calls intended for a toll-free-number or central number of an Internet Service Provider (ISP) to one of a plurality of available Internet Protocol (IP) gateways operated by the ISP. In performing the call redirection functions, various telephone network components and/or ISP components may be employed.

In an operation according to the present invention, a call is received by the telephone network at an originating switch from a subscriber's calling terminal, the call directed to a toll-free-number or a central number (TFN) for the subscriber's ISP. The originating switch forms a portion of both a signaling network and a traffic network, the signaling network and traffic network combining to form the telephone network. The originating switch interacts with the signaling network via a coupled service switching point (SSP) to request a Dialed Number (DN) corresponding to the TFN. The signaling network responds with the DN and the call is routed via the signaling network to a destination switch corresponding to the DN.

In a first embodiment of an operation according to the present invention, the destination switch (or a Private Branch Exchange "PBX" coupled to the destination switch), instead of completing the call, redirects the call to a new IP gateway coupled to a new destination switch or coupled PBX. In redirecting the call, the destination switch provides a CAUSE INDICATOR, the new called number (CLD) of the selected IP gateway, the Destination Point Code (DPC) of the new destination switch and the IP address for the subscriber to use with the new IP gateway. The destination switch then releases the call to the telephone network.

Based upon the contents of the release message, the call is routed between the originating switch and the new destination switch via a lowest point in the traffic network so that a minimum set of resources of the traffic network are consumed. The call is then setup between the subscriber's calling terminal and the new IP gateway via the originating switch and the new destination switch. An Internet session is then setup and serviced between the new IP gateway and the subscriber's calling terminal.

In a first modification to the first embodiment, the call is first routed to a PBX operated by the ISP that couples to the destination switch and the PBX redirects the call to a new IP gateway via a new destination switch. In such case, the redirection is performed by the PBX instead of the destination switch. In a second modification to the first embodiment, the signaling network itself redirects the call to a new IP gateway before the call is routed to the destination switch. In both of these modifications, the information contained in the release message causes the call to be redirected to the new IP gateway.

In a second embodiment of an operation according to the present invention, the call is terminated to the ISP facility (e.g., IP gateway) via the destination switch before the call is redirected to the new IP gateway via the new destination switch. In such case, the call is initially setup between the subscriber's calling terminal and the ISP facility via the originating switch and the destination switch. The ISP facility then interacts with the subscriber's calling terminal to determine whether the call should be redirected to a new IP gateway. If so, the ISP facility notifies the subscriber's calling terminal that the call will be redirected to a new IP gateway and can provide the subscriber's calling terminal with an IP address to use at the new IP gateway.

The ISP facility then interacts with the destination switch to release the call. The destination switch then issues a release message that includes a CAUSE INDICATOR, the DPC of the new destination switch, the CLD of the new IP gateway and, optionally, the IP address of the new IP gateway. The call is then released into the telephone network (signaling network and traffic network) and the telephone network routes the call to the new destination switch so that the call is routed via a lowest point in the traffic network. The call is then setup between the subscriber's calling terminal and the new IP gateway via the originating switch and the new destination switch. In this operation, the subscriber's calling terminal is notified of the IP address to use with the new IP gateway if it has not already been notified. An Internet session is then setup and serviced between the new IP gateway and the subscriber's calling terminal.

In a first modification to the second embodiment, the ISP facility coupled to the destination switch includes a PBX. In such case a Primary Rate Interface (PRI) connection between the destination switch and the PBX operates to complete and release the call. In a second modification to the second embodiment, before the call between the subscriber's calling terminal is released to the new IP gateway, the destination switch (or PBX) makes a call to the new IP gateway to ensure its availability. Once the call to the new IP gateway is completed via the destination switch, the call is released back into the telephone network for rerouting via a lowest point.

The selection of a new IP gateway and corresponding call redirection may be static or dynamic. In a static call selection/redirecting, all calls are redirected to a single IP gateway. In dynamic call redirection, one of a plurality of available IP gateways is selected based upon operating conditions. In making such selection, IP gateway loading, IP gateway availability, telephone network loading, telephone network availability, and telephone network routing costs are considered.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which:

FIG. 3B is a message flow diagram illustrating operation of a telephone traffic network and a telephone signaling network according to a first modification of the first embodiment of FIG. 3A in which a Private Branch Exchange couples the Internet service provider to the destination switch and initiates call redirection;

DETAILED DESCRIPTION OF THE DRAWINGS

Figure 1:
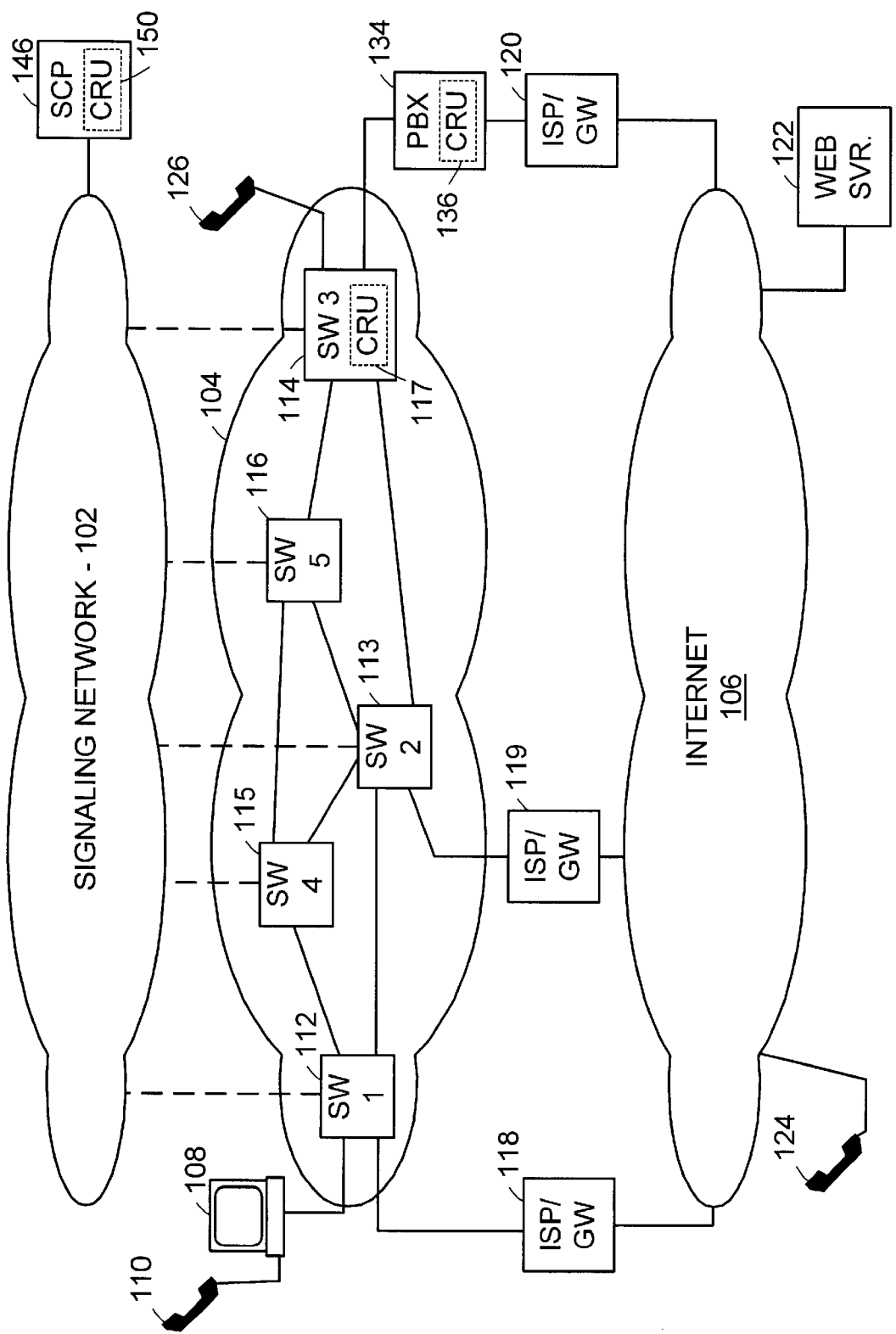
FIG. 1 is a block diagram illustrating generally a telephone signaling network, telephone traffic network and the Internet, the combination of which are operated according to the present invention.

FIG. 1 is a block diagram illustrating generally a telephone network including a signaling network 102 and a telephone traffic network 104 and the Internet 106, the combination of which are operated according to the present invention. As is generally known, telephone networks may be segregated into the traffic network 104 which carries call traffic and the signaling network 102 which provides signaling, messaging and management functions for the traffic network 104. Northern Telecom Limited (Nortel Networks) as well as other vendors support such an architecture and the structure has been standardized (to some extent) to allow such network construction to extend across platforms. A particular standard that has been developed for the signaling network 102 (that may be employed in conjunction with the present invention) is the Common Channel Signaling Number 7 (CCS7) architecture. This and similar architectures may also be constructed and operated as an Advanced Intelligent Network (AIN).

The traffic network 104 includes a plurality of digital multiplex switches (SWs) 112, 113, 114, 115 and 116 which are also referenced as SW1, SW2, SW3, SW4 and SW5, respectively. The digital switches 112–116 are interconnected by traffic trunks which carry the calls between the digital switches of the traffic network 104. The operation of the traffic network 104 is typically performed using circuit switching operations, as compared to the signaling network 102 which typically operates in a packet switched manner. The Internet 106 as well operates in a packet switched manner.

The digital switches 112–116 intercouple with the signaling network 102 via Service Switching Points (SSPs, not shown) which are typically co-located with the digital switches 112–116 and which serve as entrance points to the signaling network 102. These SSPs intercouple with other signaling network elements via the signaling network 102 infrastructure. Other signaling network elements include Signal Transfer Points (STPs, not shown) and a Service Control Point (SCP) 146. The STPs route traffic in the signaling network 102. The SCP 146 (often many SCPs couple to the signaling network 102) serves as a centralized signaling network element from which various signaling network operations may be performed. For example, the signaling network elements may call upon the SCP 146 to perform functions of the AIN in transaction processing.

The traffic network 104 couples to the Internet 106 via Internet Protocol gateways (IP gateways) 118, 119 and 120 that, for the purposes of the present invention are operated by a common Internet Service Provider (ISP). However, many additional IP gateways (operated by differing IPSs) interface the Public Switched Telephone Network (PSTN) to the Internet 106. These IP gateways 118–120 service Internet data sessions, Internet Protocol telephone service, Internet based video teleconferencing and various other operations in which the Internet 106 is employed as a portion of a traffic path between two locations.

As is shown, IP gateway 118 couples SW1 112 to the Internet 106, IP gateway 119 couples SW2 113 to the Internet 106 and IP gateway 120 couples SW3 114 to the Internet 106 via a Private Branch Exchange (PBX) 134. The construction of both IP gateways and PBXs is generally known and will be discussed herein only as related to the present invention.

FIG. 1 also shows terminal devices such as telephones and computers which are used in operations according to the present invention. As shown, computer 108 couples to SW1 112 via a modem. Further, telephone 110 couples to computer 108, the telephone 110 used to service Internet Protocol (IP) telephony service. A standard telephone 126 couples to SW3 114. Also shown is an IP telephony terminal 124 that couples directly to the Internet and a web server 122 that also couples directly to the Internet 106.

Once Internet access has been established according to the present invention, a subscriber may use computer 108 to interact with web server 122. Further, a subscriber may use telephone 110 to communicate with a user of telephone 124 in an Internet Telephony call. Moreover, the subscriber may use telephone 110 in an Internet Telephony call with a user of telephone 126, the call being routed through both the traffic network 104 and the Internet 106. As is readily apparent, many varied operations that employ the Internet 106 are supported by the structure illustrated in FIG. 1.

According to the present invention, a subscriber calls his or her ISP via a calling terminal requesting access to the Internet 106. This call is placed based upon a toll-free-number or central number for the ISP. However, in initially routing this call via the traffic network 104, the route may require using telephone system resources in a non-efficient manner. Alternately, the call may be initially routed to an overloaded IP gateway or to an IP gateway that is out of service. Thus, according to the present invention, the call is redirected from its original destination to a new IP gateway coupled to a different location on the traffic network 104. Call redirection is performed via signaling network 102 and traffic network 104 operations, these operations facilitated by at least one call redirection unit (CRU) constructed according to the present invention.

The redirection of calls may be performed statically such that all calls are redirected to a particular new IP gateway. Further, the redirection of calls may be performed dynamically such that calls are redirected to one of a plurality of IP gateways 118, 119 and 120 depending upon operating criteria. Such operating criteria includes, for example, proximity of the subscriber to each of a plurality of IP gateways 118, 119 and 120 across the traffic network 104, the cost of routing the call via the traffic network 104, the loading levels of the available IP gateways and he current outages of the ISP's IP gateways, among other criteria.

FIG. 1 shows various locations of CRUs that are constructed and deployed according to the present invention. The CRU may reside in various locations. In a first embodiment, a CRU 117 resides in a SW, e.g., SW3 114 and/or the SSP to which it couples. In this embodiment, a call is made from the computer 108, for example, to a toll-free or central number for the ISP. Based upon this toll-free or central number, the signaling network 102 determines a dialed number (DN) for the ISP and attempts to setup the call with SW3 114 which corresponds to the DN.

In a first embodiment of the present invention, the CRU 117 present in the SW3 114 (or coupled SSP) performs a redirection operation which redirects the incoming call to a new IP gateway via a lowest common point of access in the traffic network 104. The redirection operation may be a call release operation in which the signaling network 102 and traffic network 104 operate to complete a connection via the originating switch 112 and a new destination switch via a lowest common point of access in the traffic network 104. Such call redirection is performed before the call is terminated to the IP gateway corresponding to the DN.

However, in a second embodiment of the present invention, the redirection operation includes initially completing the call between the subscriber's calling terminal, e.g., 108 and the IP gateway corresponding to the DN, e.g., 120. After the initial call, in which subscriber data is gathered, the call is redirected to a new IP gateway that will continue servicing the IP session to completion. By initially completing the call to the IP gateway corresponding to the DN, the ISP may obtain information that allows the redirection to a new IP gateway that is lightly loaded, minimizes usage of the traffic network 104 or is otherwise preferred in servicing the data session.

Redirecting calls such that they are routed via the lowest common point of access in the traffic network 104 requires cooperation of the traffic network 104 and the signaling network 102. In a first example of such routing operations, a call is initially routed from SW1 112 to SW3 114 via SW2 113. However, according to the present invention, the call is redirected to IP gateway 119 which will service the IP session and that is itself serviced by SW2 113. Thus, when the call is released, the call is initially released backwards from SW3 114 to SW2 113. When the call is released to SW2 113, a lowest point of access has been reached and the call is completed to IP gateway 119.

In another example of operation according to the present invention a call is initially routed from SW1 112 to SW3 114 via SW2 113. However, according to the present invention, the call is redirected to IP gateway 118 which will service the IP session and that is itself serviced by SW1 112. Thus, when the call is released, the call is initially released backwards from SW3 114 to SW2 113. The call is then released backwards again to SW1 112 which is the lowest point of access to IP gateway 118. When the call is released to SW1 112, the call is completed to IP gateway 118.

In still another example of operation according to the present invention a call is initially routed from SW1 112 to SW3 114 via SW4 115 and SW5 116. However, according to the present invention, the call is redirected to IP gateway 119 which will service the IP session and that is itself serviced by SW2 113. Thus, when the call is released, the call is initially released backwards from SW3 114 to SW5 116. The call is then released backwards again to SW4 115 which is the lowest point of access to IP gateway 119 for the routing path. When the call is released to SW2 113, the call is completed to IP gateway 119. In another operation, the call may be released again to SW1 112 and routed directly to SW2 113.

Figure 2A:
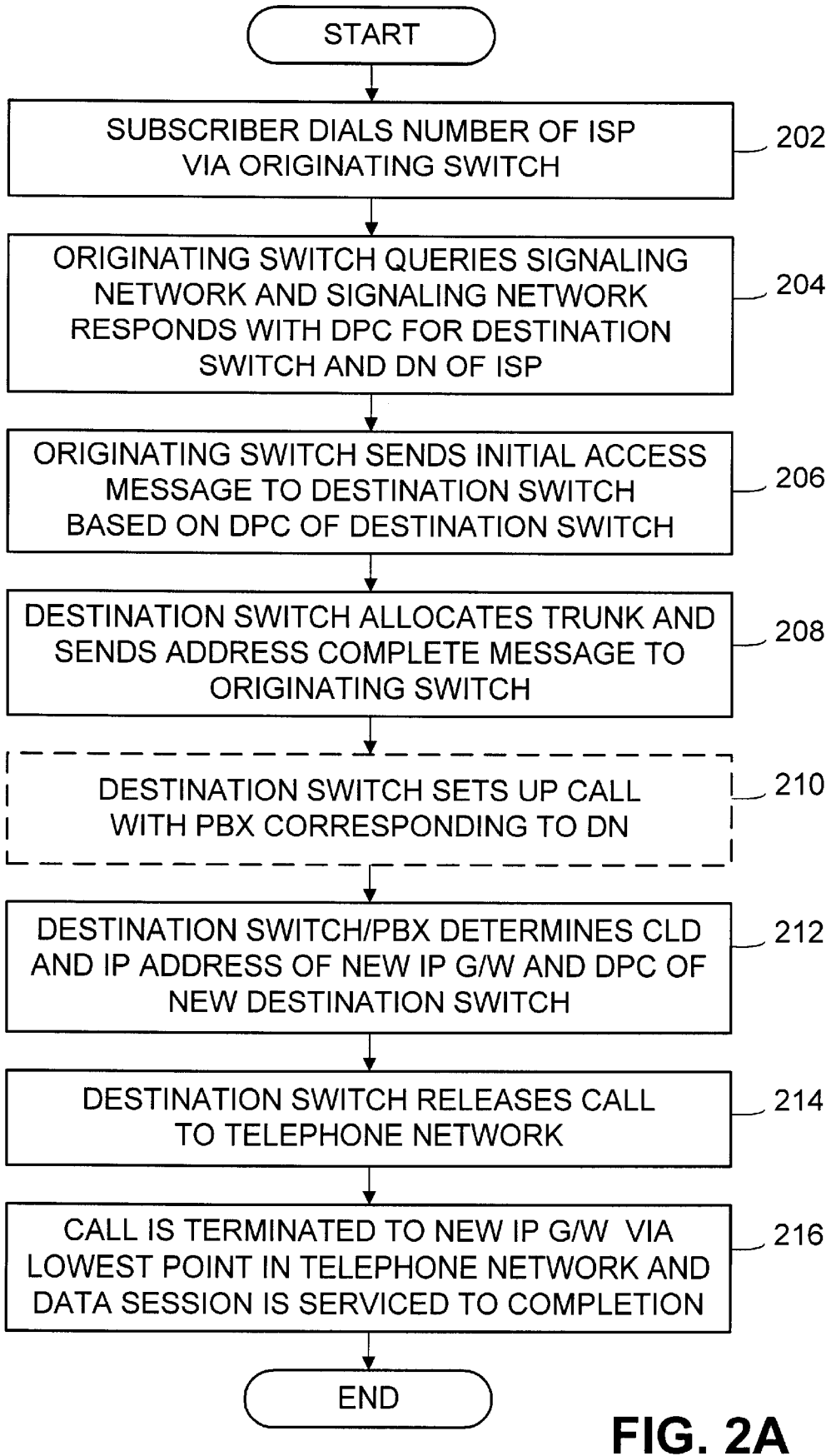
FIG. 2A is a logic diagram illustrating operation of a telephone traffic network and a telephone signaling network according to a first embodiment of the present invention in redirecting a call intended for an Internet service provider.

FIG. 2A is a logic diagram illustrating operation of a telephone traffic network and a telephone signaling network (in combination, the telephone network) according to a first embodiment of the present invention in redirecting a call intended for an Internet service provider. As is recalled from the discussion with reference to FIG. 1, in the first embodiment, a subscriber's call is released and linked via operation by a SW/SSP (or PBX) corresponding to the DN of the call without completing the call to the ISP via the DN.

Operation commences at step 202 where a subscriber dials a toll free number (TFN) (or central number) corresponding to its ISP via a connection with an originating switch. In making this call, the subscriber desires to initiate an Internet session, IP telephony session or another session in which Internet access is required. At step 204, the originating switch queries the signaling network for a DN corresponding to the toll free number (or central number) for the subscriber's ISP. Further, at step 204, the signaling network responds with a DN for a serving SW corresponding to the IP gateway.

At step 206 the originating switch sends an initial access message (IAM) to the destination switch corresponding to the DN of the ISP via the signaling network. At step 208 the destination switch allocates an available trunk of the traffic network to the originating switch and sends an address complete message (ACM) to the originating switch. At optional step 210, the originating switch sets up the call with a PBX corresponding to the DN.

Then, at step 212, the destination switch (or PBX) selects a new IP gateway for servicing the call, determines the CLD for the IP gateway, determines the IP address of the new IP gateway and the destination point code (DPC) of a new destination switch that will service the call. Once this determination is made, the destination switch releases the call into the telephone network (traffic network and signaling network) for redirection to the new destination switch at step 214.

In releasing the call, the destination switch sends a release (RLS) message via the signaling network that uniquely identifies the operation. This message includes a CAUSE INDICATOR, a new CLD (for the new serving IP gateway), the DPC of the new serving SW and an IP address that the subscriber is to employ at the new serving IP gateway. As was previously discussed, in redirecting the call to a new IP gateway, the CRU corresponding to the destination switch or PBX may perform static or dynamic IP gateway selection.

Next, at step 216, based upon contents of the release message, the call is redirected to the new destination switch via the lowest common point of access in the telephone traffic network. Rerouting the call via the lowest common point of access routing is performed in cooperation between the signaling network and the traffic network. Further, at step 216, the call is terminated to the new destination switch and a data session is serviced between the coupled IP gateway and the subscriber's calling terminal.

Figure 2B:
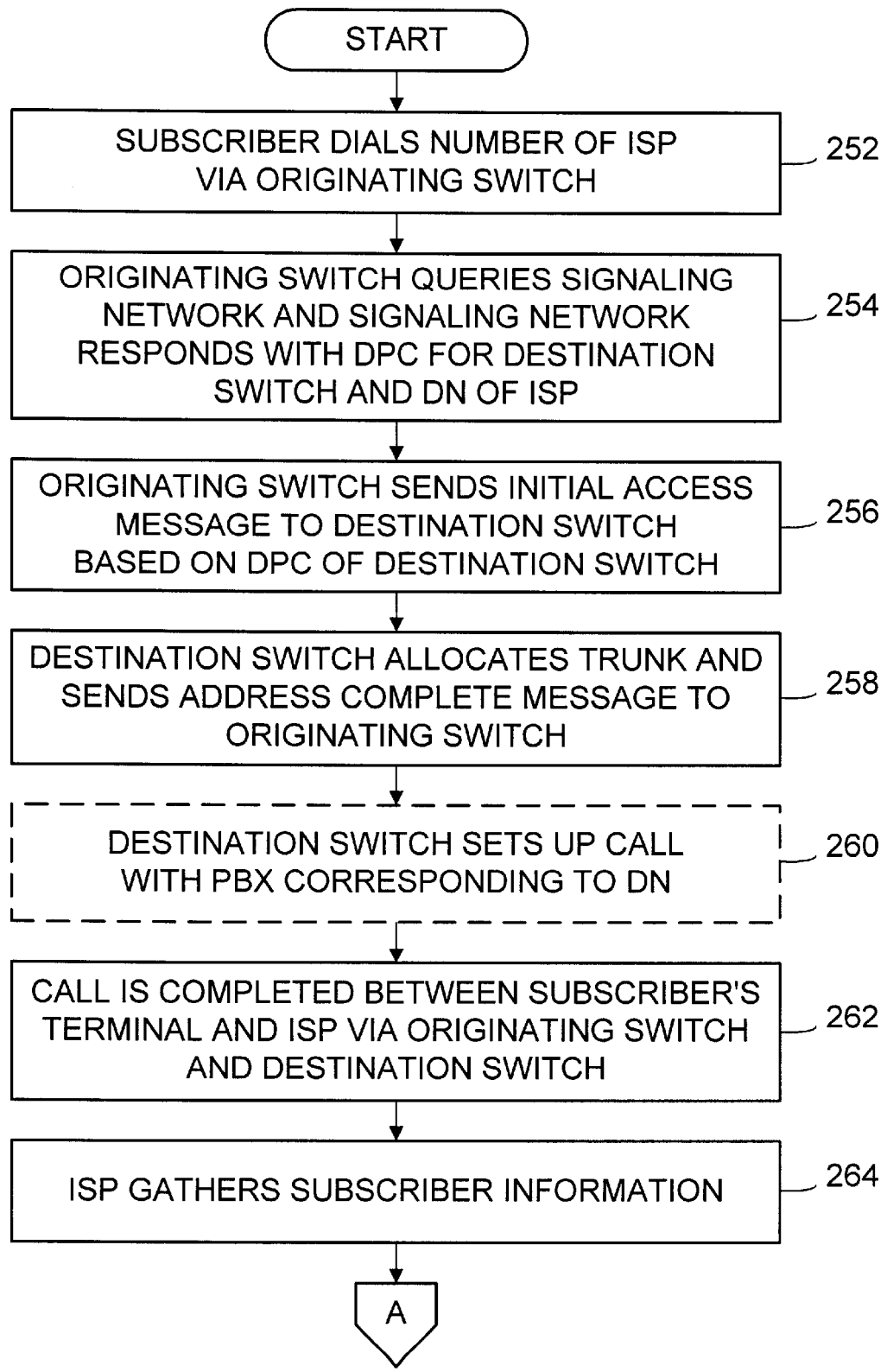
FIGS. 2B and 2C are logic diagrams illustrating operation of a telephone traffic network and a telephone signaling network according to a second embodiment of the present invention in redirecting a call intended for an Internet service provider.
Figure 2C:
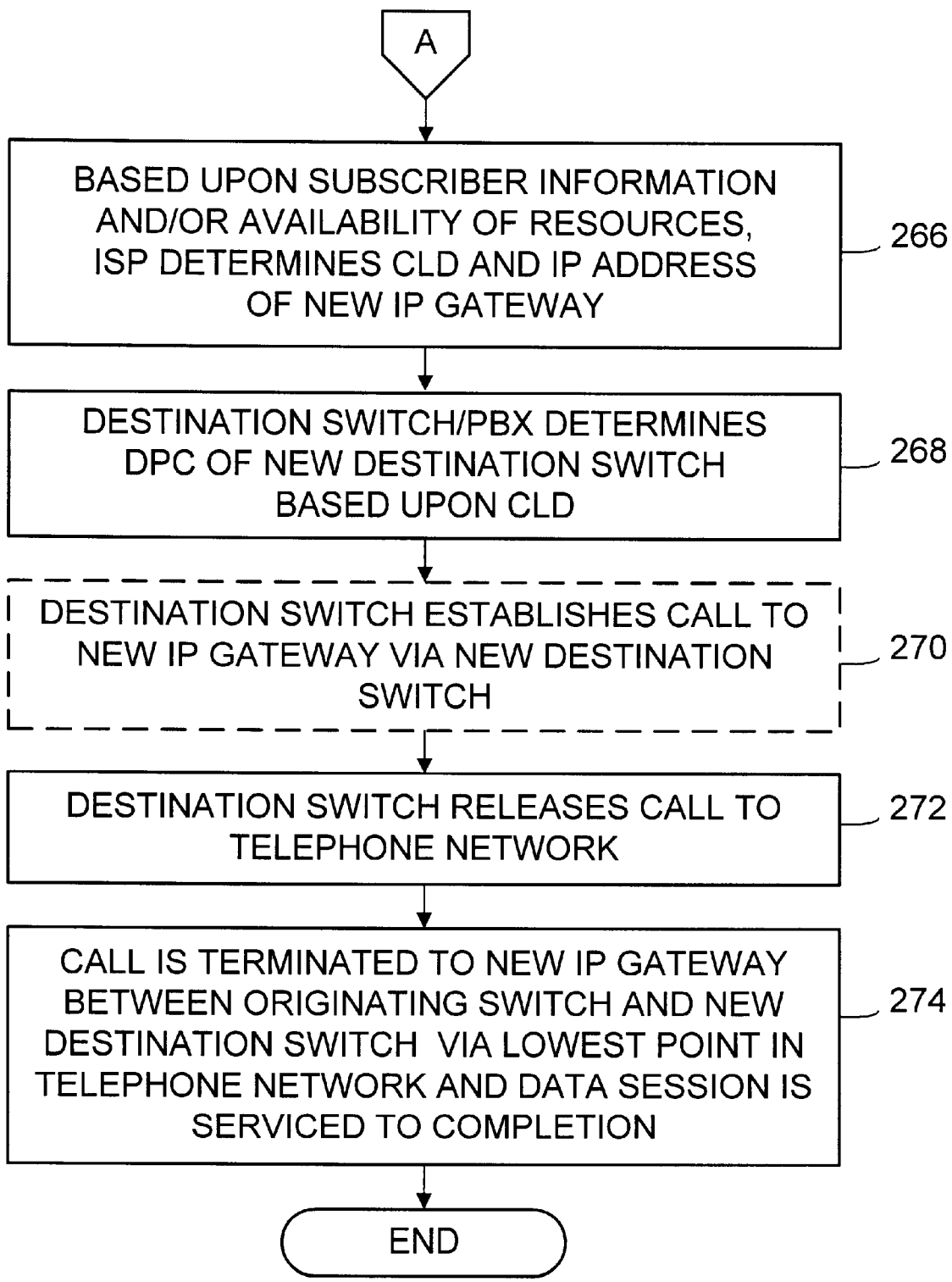

FIGS. 2B and 2C are logic diagrams illustrating operation of a telephone traffic network and a telephone signaling network (in combination, the telephone network) according to a second embodiment of the present invention in redirecting a call intended for an Internet service provider. As is recalled from the discussion with reference to FIG. 1, in the second embodiment, a subscriber call is initially terminated to the ISP facility via the destination switch prior to call redirection.

Operation commences at step 252 of FIG. 2B where a subscriber dials a toll free number (or central number) corresponding to its ISP via an originating switch. In making this call, the subscriber desires to initiate an Internet session, IP telephony session or another session in which Internet access is required. At step 254, the originating switch queries the signaling network for a DN corresponding to the toll free number (or central number) for the ISP and the DPC of a destination switch and the signaling network responds with such information.

At step 256 the originating switch sends an initial access message to the destination switch based upon the DPC. The destination switch then allocates a trunk to service the call and sends an address complete message to the originating switch at step 258. At optional step 260, the destination switch sets up the call with a coupled PBX corresponding to the DN if one exists.

Then, at step 262, the originating switch/destination switch/PBX complete the call between the subscriber and the ISP. Once the connection is complete, operation proceeds to step 264 where the ISP gathers information from the subscriber, some of which may be employed to determine another IP gateway that will be used to service the data session.

Operation then proceeds to FIG. 2C via off-page connector where, based upon the subscriber information collected and/or the availability of resources, the ISP determines the new IP gateway that will be employed at step 266. At the same time, the ISP determines the CLD and IP address of the new serving IP gateway. Then, at step 268, the destination switch or the PBX determines the DPC of the new destination switch based upon the CLD for the IP gateway to be called. Alternately, the destination switch may determine the DPC of the new destination switch based upon interaction with the signaling network.

At optional step 270, the destination switch establishes a call to the new IP gateway via the new destination switch. When this step is performed, it guarantees that the subscriber will have access to the new IP gateway for subsequent data call servicing. Then, at step 272, the destination switch releases the call to the telephone network. At step 274, the call is terminated to the new IP gateway via the lowest point in the telephone network and the data session is serviced to completion.

Figure 3A:
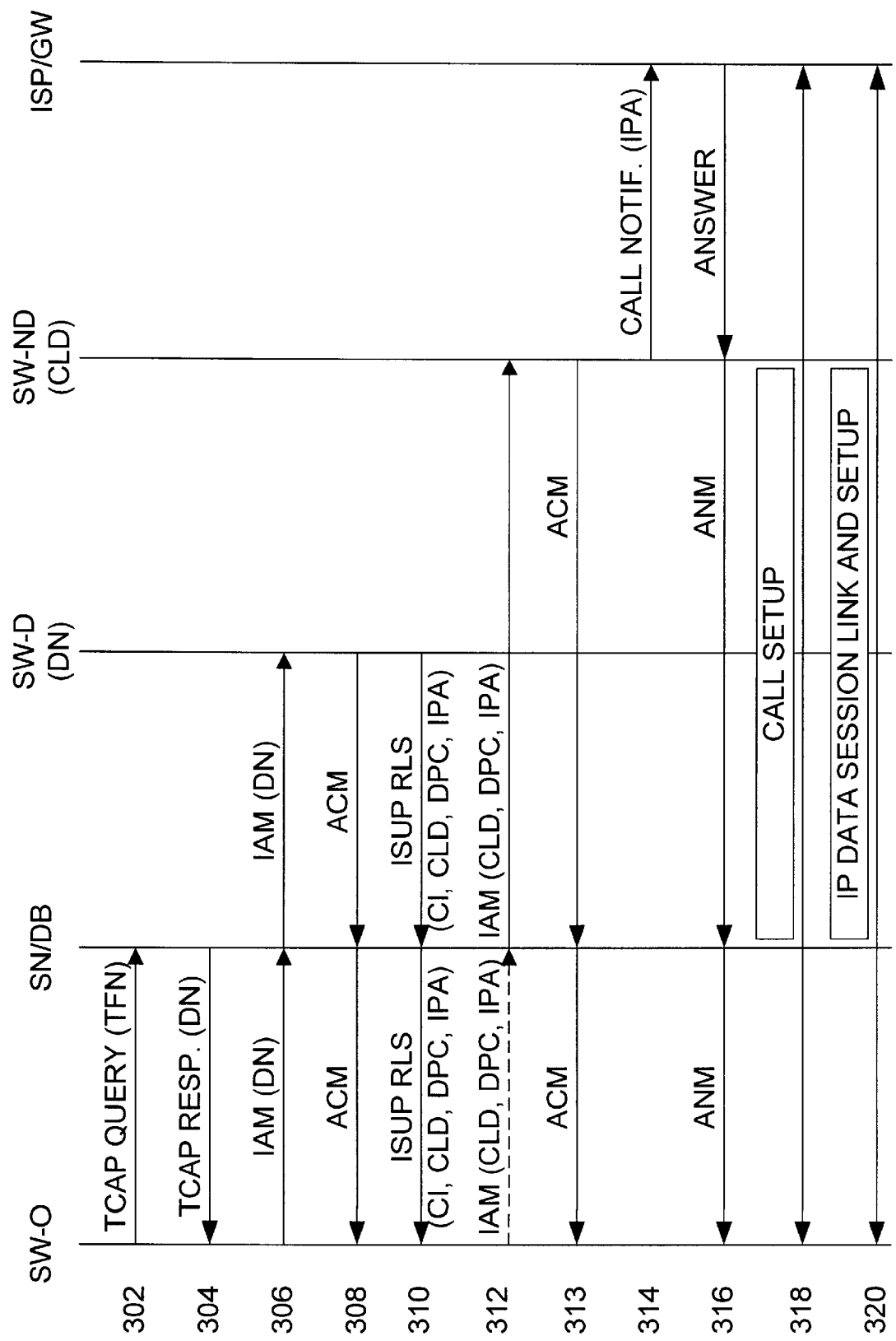
FIG. 3A is a message flow diagram illustrating operation of a telephone traffic network and a telephone signaling network according to the first embodiment of the present invention in redirecting a call intended for an Internet service provider in which a destination switch redirects the call to a new destination switch.

FIG. 3A is a message flow diagram illustrating operation of a telephone traffic network and a telephone signaling network according to the first embodiment of the present invention in redirecting a call intended for an ISP in which a destination switch redirects the call to a new destination switch. At 302, the subscriber initiates a call to his or her ISP by dialing a telephone number corresponding to the ISP. The originating switch sends a TCAP QUERY message to the signaling network requesting the DN for the telephone number. A database lookup is performed by the signaling network, a DN is determined for the telephone number and the DN is returned in a TCAP QUERY RESP message at 304.

Based upon the DN, the originating switch sends an IAM (Initial Access Message) to the signaling network at 306 which the signaling network terminates to a corresponding destination switch. Upon receipt of the IAM, the destination switch sends an ACM (Address Complete Message) to the originating switch via the signaling network at 308. The ACM allows the originating switch to couple to the destination switch across the traffic network via an assigned traffic trunk(s).

Then, according to the present invention, a CRU contained in the destination switch determines that the call is to be redirected to a new IP gateway which will service the data call that is to be setup. Thus, at 310, the destination switch sends an ISUP RLS message via the signaling network to the originating switch. Contained in the ISUP RLS message is a CAUSE INDICATOR which is a parameter that identifies this type of call to the switches in the traffic network and elements of the signaling network. Also included in the ISUP RLS message is the CLD of the new IP gateway, the DPC of the new destination switch and the IP address to be employed at the new IP gateway.

In response to the ISUP RLS message, at 312, either the signaling network (e.g., a SCP in the signaling network) or the originating switch generates an IAM message identifying the CLD of the new IP gateway and the DPC of the new destination switch. The signaling network routes the IAM message to the new destination switch. In response, the new destination switch sends an ACM message via the signaling network to the originating switch at 313 and the new destination switch notifies the new IP gateway that a call is incoming that it is to service at 314. The IP gateway answers at 316 and an ANM message is relayed to the originating switch. The call is then setup at 318 and the IP data session is linked and setup at 320. The data call is then serviced between the subscriber's calling terminal until completion.

FIG. 3B is a message flow diagram illustrating operation of a telephone traffic network and a telephone signaling network according to a first modification of the first embodiment of FIG. 3A in which a PBX couples the ISP to the destination switch and initiates call redirection. For simplicity in illustration, the new destination switch is not shown in FIG. 3B. However, when operation returns to the description of FIG. 3A, the new destination switch operates with the other switches as shown.

In transitioning from FIG. 3A to FIG. 3B, the operations of 306 and 308 are first performed. Then, at 352, after the destination switch sends an ACM to the originating switch at 308, the destination switch sends a PRI CALL SETUP message to the PBX that is coupled thereto. In response to the CALL SETUP message, the PBX responds with a RELEASE message which includes the CAUSE INDICATOR at 354, the CLD of the new IP gateway and the IP address the subscriber is to use at the new IP gateway. The destination switch then issues an ISUP RLS message to the signaling network at 310, such operation previously described with reference to FIG. 3A. From 310, the operations of FIG. 3A are then rejoined and continued.

Figure 4A:
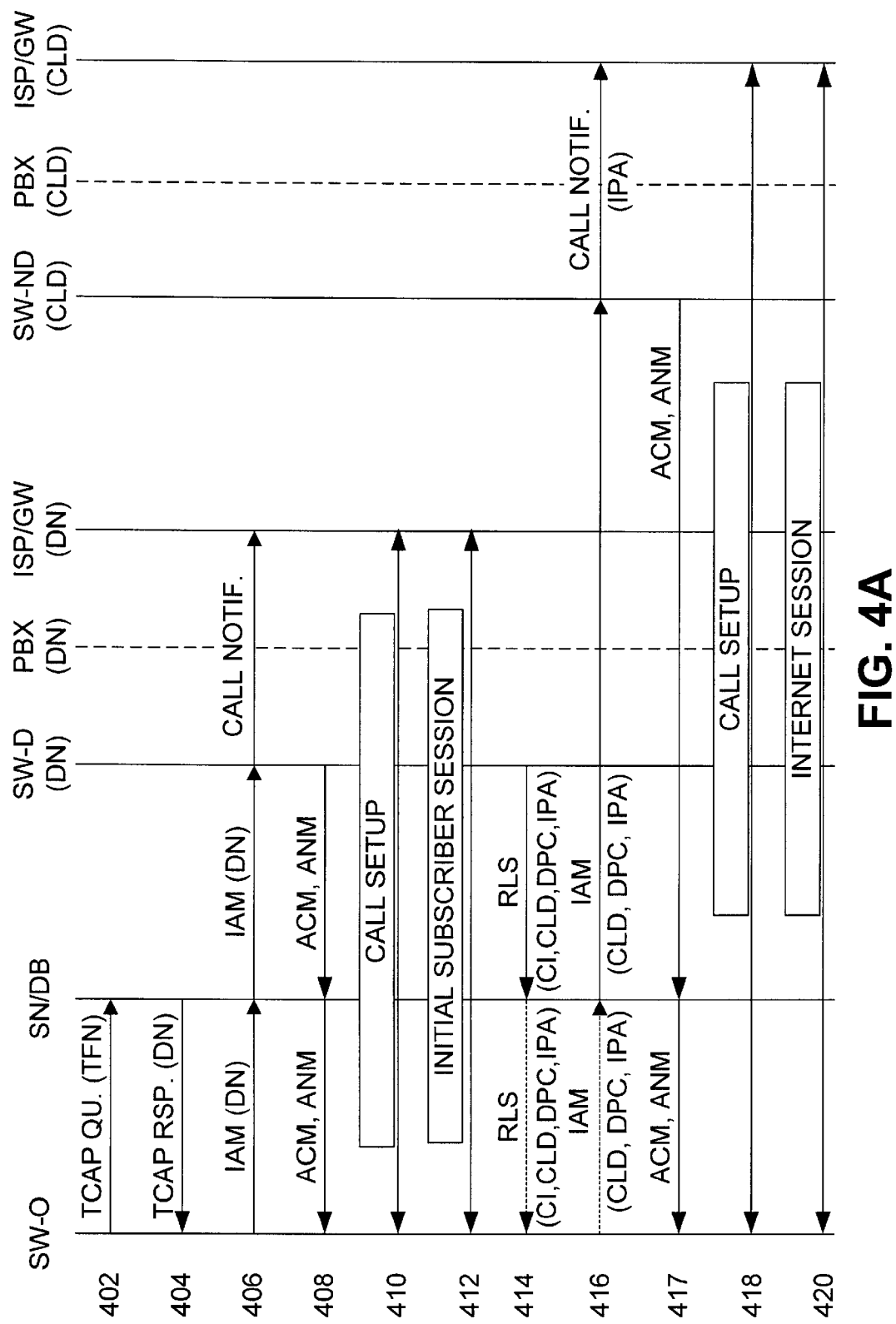
FIG. 4A is a message flow diagram illustrating operation of a telephone traffic network and a telephone signaling network according to a second embodiment of the present invention in redirecting a call in which the call is initially completed between the subscriber's calling terminal and the ISP's facility via a destination switch and is later redirected to a new IP gateway.

FIG. 4A is a message flow diagram illustrating operation of a telephone traffic network and a telephone signaling network according to a second embodiment of the present invention in redirecting a call in which the call is initially completed between the subscriber's calling terminal and the ISP's facility via a destination switch and is later redirected to a new IP gateway. At 402, the subscriber initiates a call to his or her ISP by dialing a telephone number corresponding to the ISP. The originating switch sends a TCAP QUERY message to the signaling network requesting the DN for the telephone number. The signaling network performs a database lookup, determines a DN for the telephone number and returns the DN in a TCAP QUERY RESP message at 404.

Based upon the DN, the originating switch sends an IAM message to the signaling network at 406. The signaling network routes the IAM message to the destination switch where it is received. In response to the IAM, the destination switch sends a call notification message to the IP gateway, allocates traffic trunk resources to the originating switch, and notifies the originating switch of such allocation in an ACM message at 408. Further, at 408, an ANM message is sent from the destination switch to the originating switch via the signaling network. However, the ACM message is sent prior to the ANM message and the ANM message is sent only if the new IP gateway answers.

The call is then setup at 410 to the ISP IP gateway (via a PBX in a modification of the second embodiment) and an initial subscriber session is held. In the initial subscriber session, the ISP interacts with the subscriber (subscriber's calling terminal) and determines whether the call should be redirected to a new IP gateway. Further, based upon this information, as well as the availability and loading of the ISP's other IP gateways, and other network resources, the ISP selects a new IP gateway that will service the call.

Based upon this determination, the ISP interacts with the destination switch (or PBX as the case may be to initiate call redirection). In response, the destination switch (or PBX) generates a RLS message at 414 that includes the CAUSE INDICATOR, the CLD of the new IP gateway, the DPC of the new destination switch that will service the call to the new IP gateway and the IP address that the subscriber's calling terminal is to use with the new IP gateway. This RLS message may be forwarded via the signaling network to the originating switch. Alternately, the new IP address is provided to the subscriber's calling terminal during the initial subscriber session at 412. In such case, the RLS message does not route to the originating switch unless the originating switch is the lowest point in the telephone network between the originating switch and the new destination switch.

Once the lowest point path in the network is established, an IAM message (based upon the CLD) is sent to the new destination switch at 416. Further, at 416, a call notification message is sent to the new destination gateway (via a coupled PBX, in one embodiment). In response to the IAM, the new destination switch allocates traffic trunk resources to the originating switch and notifies the originating switch of such allocation in an ACM message at 417. Further, at 417, an ANM message is sent from the destination switch to the originating switch via the signaling network after the new IP gateway answers the call. However, the ACM message is sent prior to the ANM message and the ANM message is sent only if the new IP gateway answers.

The new destination switch receives the IAM message and initiates call setup to the new IP gateway of the ISP via the originating switch at 418. In a variation of this operation, when the ISP includes a PBX that couples the new IP gateway to the new destination switch, the PBX resides in the path of the call. The subscriber's calling terminal and the new IP gateway then establish an Internet session at 420 and the session is serviced to completion.

Figure 4B:
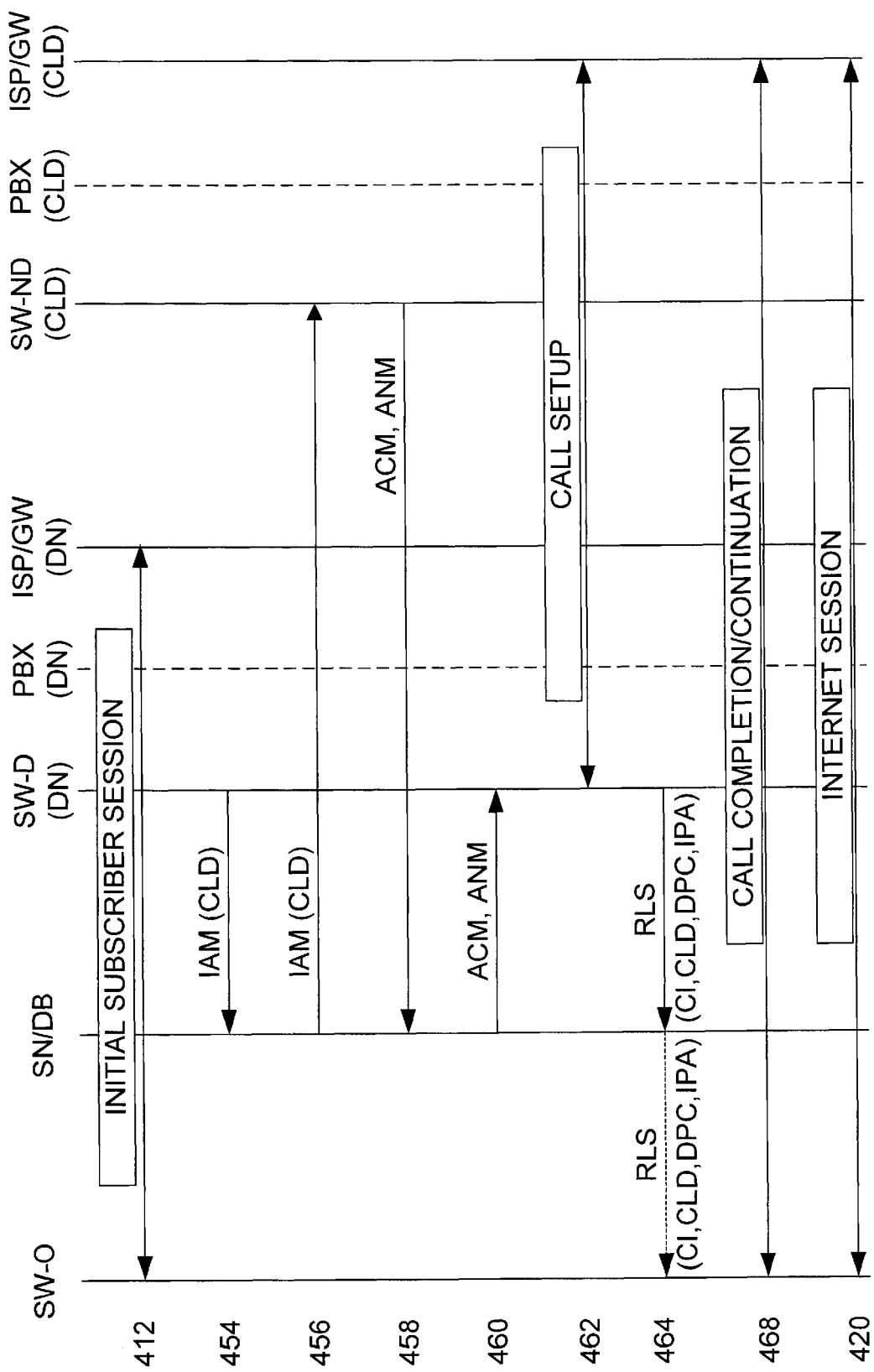
FIG. 4B is a message flow diagram illustrating operation of a telephone traffic network and a telephone signaling network according to a first modification of the second embodiment of FIG. 4A in which the destination switch (or PBX) coupled to the IP gateway of the ISP places a call to a new IP gateway of the ISP before releasing the call into the telephone network for redirection to the new IP gateway.

FIG. 4B is a message flow diagram illustrating operation of a telephone traffic network and a telephone signaling network according to a first modification of the second embodiment of FIG. 4A in which the destination switch (or PBX) coupled to the IP gateway of the ISP places a call to a new IP gateway of the ISP before releasing the call into the telephone network for redirection to the new IP gateway. According to the modification, after the initial subscriber session is held at 412, the new IP gateway is selected. Then, at 454, an IAM (CLD) is sent from the destination switch (or optionally the ISP's PBX) to the signaling network and intended for the new destination switch. The signaling network routes the IAM (CLD) message to the new destination switch at 456.

At 458, the new destination switch responds with an ACM and allocates resources to establish a traffic trunk link to the destination switch. Subsequently, the new destination switch will send a Call Notification message to the new IP gateway (via a PBX if one is present). In response, the new destination switch will send an ANM to the destination switch via the signaling network. The timing of these messages of course does not overlay.

The new destination switch completes the call to the new IP gateway based upon the CLD contained in the IAM. At 460, the ACM is routed to the destination switch notifying the destination switch of the new destination switch's receipt of the IAM and its linking operation. Then, at 462, the call is setup between the destination switch and the new IP gateway. At 464, the call is released from the destination switch so that it may be redirected to the new destination switch via a lowest point in the traffic network. At 468, the call is completed/continued between the subscriber's calling terminal coupled to the originating switch and the new IP gateway coupled to the new destination switch (also via an ISP gateway should one exist in the path). Then, the Internet session is serviced at 420 as previously described with reference to FIG. 4A.

Figure 5:
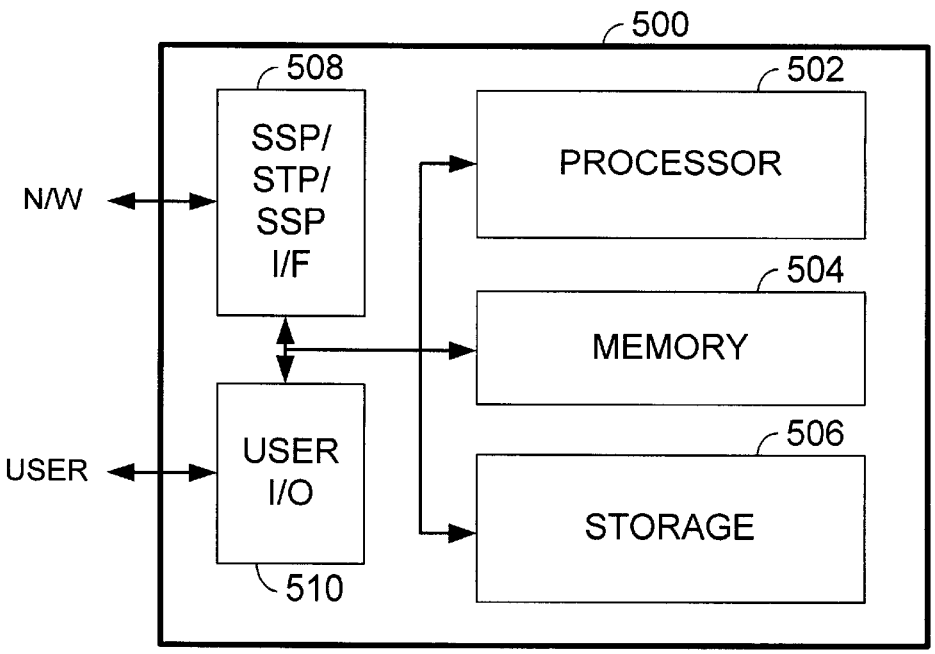
FIG. 5 is a block diagram generally illustrating the construction of a signaling network element that performs call redirection operations according to the present invention.

FIG. 5 is a block diagram generally illustrating the construction of a signaling network element that performs call redirection operations according to the present invention. The signaling network element (SNE) 500 may be a SCP as was previously described with reference to FIG. 1. The SNE 500 is a digital device and includes a processor 502, memory 504, storage 506, an Interface 508 and an Input/Output 510. These devices are intercoupled via a communication path that may be a bus.

The processor 502 may be one or more processing devices that are selected and intercoupled to accomplish the call redirection functions according to the present invention as well as other functions required of the SNE 500. The memory 504 stores instructions and data and may be Dynamic Random Access Memory, Static Random Access Memory or other memory that is usable by the processor 502 during its ongoing operations. The storage 506 provides the SNE 500 with long term storage of data and instructions and may be magnetic disk storage, optical storage, tape storage or other long-term storage devices.

The Interface 508 couples the SNE 500 to other elements of the signaling network including SSPs and STPs, for example. Since the signaling network is packet switched, the Interface 508 supports packet switching operations consistent with the type of packet switching supported by the signaling network. Finally, the SNE 500 includes a user Input/Output interface 510 that interfaces the SNE 500 to a user. Such interface may couple the SNE 500 to a console (either locally or remotely) to allow a user to program and modify operations of the SNE 500.

The call redirection functions of the SNE 500, in one embodiment, are accomplished by the processing of a set of software instructions that are stored in the SNE 500. These software instructions are stored in the storage 506 and the memory 504 and selectively executed by the processor 502. In executing these operations, the processor 502 uses the Interface 508 to interact with coupled SSPs, STPs and databases. These operations have been previously described. In another embodiment, at least some of the operations are performed by dedicated hardware components that have been pre-programmed or pre-wired to perform the operations.

Figure 6:
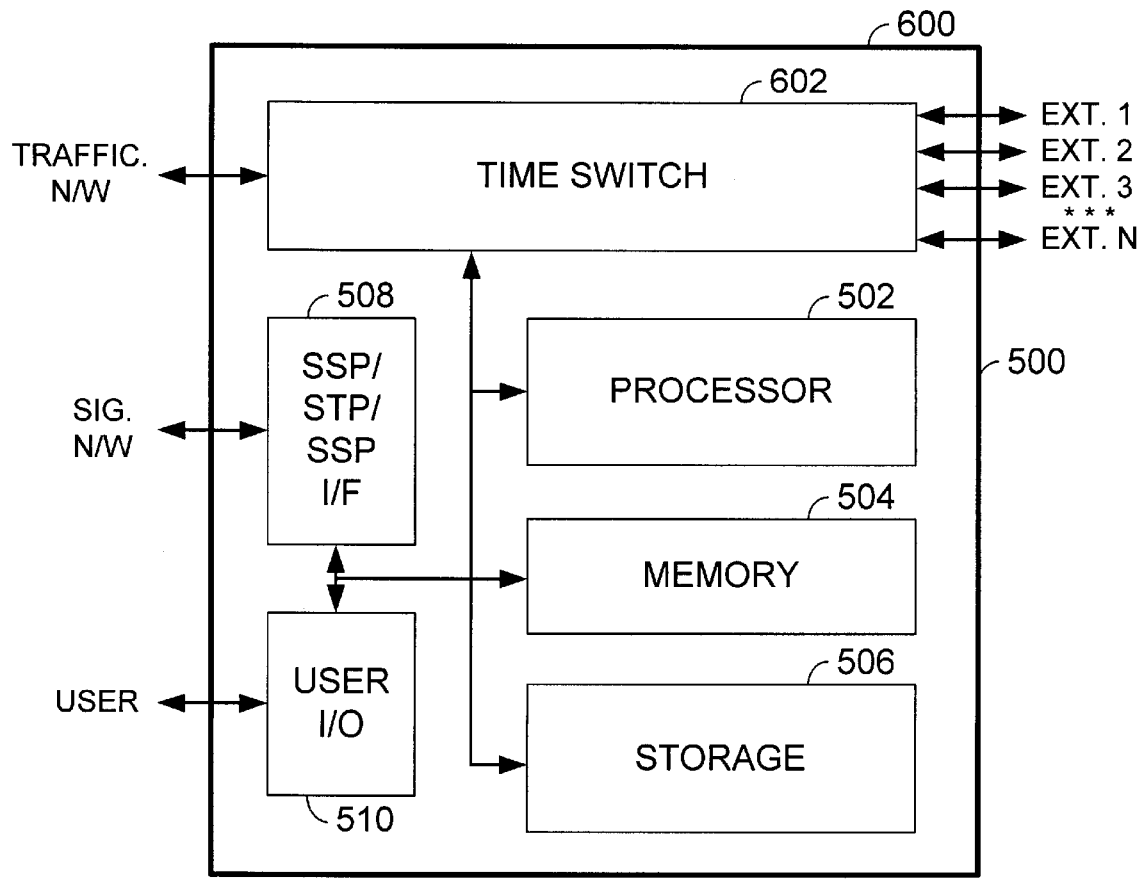
FIG. 6 is a block diagram generally illustrating the construction of a Private Branch Exchange (or telephone network switch) that performs call redirection operations according to the present invention.

FIG. 6 is a block diagram generally illustrating the construction of a Private Branch Exchange (or telephone network switch) that performs call redirection operations according to the present invention. The construction of the PBX/switch 600 is similar to that of the SNE 500. Thus, those components previously discussed retain common numbering convention and will not be discussed again with reference to FIG. 6. The PBX/switch 600, however, also includes a time switch 602 that performs time based switching operations to couple a plurality of extensions to the traffic network. The construction of PBXs/switches is generally known and is described only with reference to the present invention.

According to the present invention, the PBX/switch 600 also performs call redirection operations. In performing these call redirection operations, the PBX/switch 600 performs operations based upon instructions stored in its memory 504 and storage 506. Interaction with the signaling network is performed via Interface 508 and calls are routed via the time switch 602. In another embodiment, at least some of the operations are performed by dedicated hardware components that have been pre-programmed or pre-wired to perform the operations.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a telephone network having a plurality of intercoupled switches that form a traffic network and a plurality of intercoupled signaling network elements that form a signaling network, a method for redirecting a call intended for an Internet Service Provider, the method comprising:

receiving a call from a terminal coupled to an originating switch of the plurality of switches, the call intended for an Internet Service Provider facility coupled to a destination switch;

initiating routing of the call to the Internet Service Provider facility;

determining that the call is to be redirected to a new Internet Protocol gateway;

determining a new destination switch corresponding to the new Internet Protocol gateway;

redirecting the call to the new Internet Protocol gateway via the new destination switch; and terminating the call from the terminal to the new Internet Protocol gateway via the originating switch and the new destination switch via a lowest point in the telephone traffic network.

2. The method of claim 1, wherein the new Internet Protocol gateway is statically selected.

3. The method of claim 1, wherein the new destination Internet Protocol gateway is dynamically selected from a plurality of Internet Protocol gateways based upon operating criteria.

4. The method of claim 3, wherein the operating criteria is selected from the group consisting of Internet Protocol gateway loading levels, Internet Protocol gateway outages, telephone network routing costs and telephone network loading levels.

5. The method of claim 1, wherein:

determining that the call is to be redirected and determining a new Internet Protocol gateway are performed by the destination switch; and redirecting the call to the new Internet Protocol gateway via the new destination switch is initiated by the destination switch.

6. The method of claim 1, wherein:

determining that the call is to be redirected to a new Internet Protocol gateway is performed by a Private Branch Exchange coupled to the destination switch; and redirecting the call to the new Internet Protocol gateway via the new destination switch is initiated by the Private Branch Exchange.

7. The method of claim 1, wherein:

determining that the call is to be redirected to a new Internet Protocol gateway is performed by a signaling network element; and redirecting the call to the new Internet Protocol gateway via the new destination switch is initiated by the signaling network element.

8. The method of claim 7, wherein the signaling network element comprises a signal control point.

9. In a telephone network having a plurality of intercoupled switches that form a traffic network and a plurality of intercoupled signaling network elements that form a signaling network, a method for redirecting a call intended for an Internet Service Provider, the method comprising:

receiving a call from a terminal coupled to an originating switch of the plurality of switches, the call intended for an Internet Service Provider facility coupled to a destination switch;

initiating routing of the call to the Internet Service Provider facility;

terminating the call to the Internet Service Provider facility via the destination switch;

collecting subscriber information;

determining that the call is to be redirected to a new Internet Protocol gateway;

determining a new destination switch corresponding to the new Internet Protocol gateway;

redirecting the call to the new Internet Protocol gateway via the new destination switch;

providing the terminal with an IP address corresponding to the destination Internet Protocol gateway; and terminating the call from the terminal to the new Internet Protocol gateway via the originating switch and the new destination switch via a lowest point in the telephone traffic network.

10. The method of claim 9, further comprising initiating and completing a call from the destination switch to the new Internet Protocol gateway via the new destination switch prior to redirecting the call.

11. The method of claim 9, further comprising:

completing the call to a Private Branch Exchange of the Internet Service Provider facility; and initiating and completing a call between the Private Branch Exchange and the new Internet Protocol gateway via the new destination switch prior to redirecting the call.

12. The method of claim 9, wherein the new Internet Protocol gateway is statically selected.

13. The method of claim 9, wherein the new destination Internet Protocol gateway is dynamically selected based upon operating criteria.

14. The method of claim 13, wherein the operating criteria is selected from the group consisting of Internet Protocol gateway loading levels, Internet Protocol gateway outages, telephone network routing costs and telephone network loading levels.

15. The method of claim 9, wherein:

determining that the call is to be redirected to a new Internet Protocol gateway is performed by the destination switch; and redirecting the call to the new Internet Protocol gateway via the new destination switch is initiated by the destination switch.

16. The method of claim 9, wherein:

determining that the call is to be redirected to a new Internet Protocol gateway is performed by a Private Branch Exchange coupled to the destination switch; and redirecting the call to the new Internet Protocol gateway via the new destination switch is initiated by the Private Branch Exchange.

17. The method of claim 9, wherein:

determining that the call is to be redirected to a new Internet Protocol gateway is performed by a signaling network element; and redirecting the call to the new Internet Protocol gateway via the new destination switch is initiated by the signaling network element.

18. The method of claim 17, wherein the signaling network element comprises a signal control point.

19. For operation within a telephone network that includes a traffic network and a signaling network, a telephone network component comprising:

a signaling network interface that interfaces the telephone network component to the signaling network;

a processor adapted to execute instructions and to operate upon data; and memory adapted to store instructions and data, the memory storing instructions that cause the telephone network component to:

receive a call request from a originating switch on behalf of a subscriber's terminal, the call request corresponding to a call to be completed from the subscriber's terminal to an Internet Service Provider facility coupled to a destination switch;

determine that the call is to be redirected from the Internet Service Provider facility to a new Internet Protocol gateway;

determine the identity of a new destination switch that corresponds to the new Internet Protocol gateway; and redirect the call request to the new Internet Protocol gateway via the new destination switch through a lowest point in the telephone traffic network.

20. The telephone network component of claim 19, wherein the telephone network component statically selects new Internet Protocol gateway.

21. The telephone network component of claim 19, wherein the telephone network component dynamically selects the new Internet Protocol gateway from a plurality of Internet Protocol gateways based upon operating criteria.

22. The telephone network component of claim 21, wherein the operating criteria is selected from the group consisting of Internet Protocol gateway loading levels, Internet Protocol gateway outages, telephone network routing costs and telephone network loading levels.

23. The telephone network component of claim 19, wherein the telephone network component comprises a service control point coupled to the signaling network.

24. The telephone network component of claim 19, wherein the telephone network component comprises the destination switch.

25. The telephone network component of claim 19, wherein the telephone network component comprises a Private Branch Exchange coupled to the destination switch.

26. For operation within a telephone network that includes a traffic network and a signaling network, a telephone network component comprising:

a signaling network interface that interfaces the telephone network component to the signaling network;

a time switch that couples the telephone network component to the traffic network;

a processor adapted to execute instructions and to operate upon data; and memory adapted to store instructions and data, the memory storing instructions that cause the telephone network component to:

receive a call originated from a subscriber's terminal coupled to an originating switch, the call intended for an Internet Service Provider facility coupled to the telephone network component via the time switch;

determine that the call is to be redirected to a new Internet Protocol gateway;

determine a new destination switch corresponding to the new Internet Protocol gateway; and redirect the call to the new Internet Protocol gateway via the new destination switch through a lowest point in the traffic network.

27. The telephone network component of claim 26, wherein the telephone network component statically selects the new Internet Protocol gateway.

28. The telephone network component of claim 26, wherein the telephone network component dynamically selects a new Internet Protocol gateway of a plurality of Internet Protocol gateways based upon operating criteria.

29. The telephone network component of claim 28, wherein the operating criteria is selected from the group consisting of Internet Protocol gateway loading levels, Internet Protocol gateway outages, telephone network routing costs and telephone network loading levels.

30. The telephone network component of claim 26, wherein the telephone network component comprises the destination switch.

31. The telephone network component of claim 26, wherein the telephone network component comprises a Private Branch Exchange coupled to the destination switch.

* * * * *